C. B. JOHNSON & P. VAN VLAANDEREN.
MOIRE MACHINE.
APPLICATION FILED JAN. 20, 1910.
961,863.
Patented June 21, 1910.
5 SHEETS—SHEET 1.
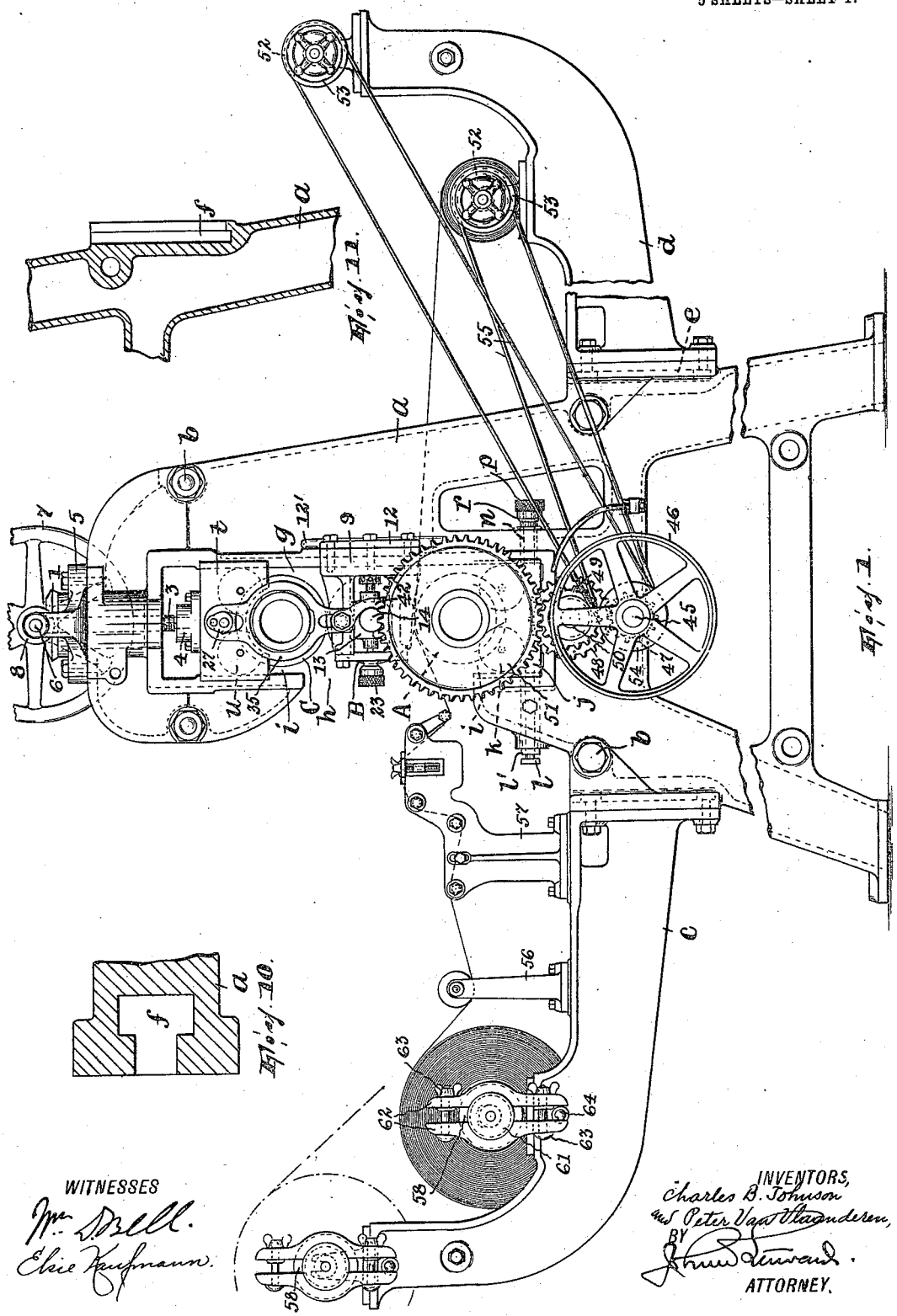
WITNESSES
INVENTORS,
Charles B. Johnson
and Peter Van Vlaanderen,
BY
ATTORNEY.

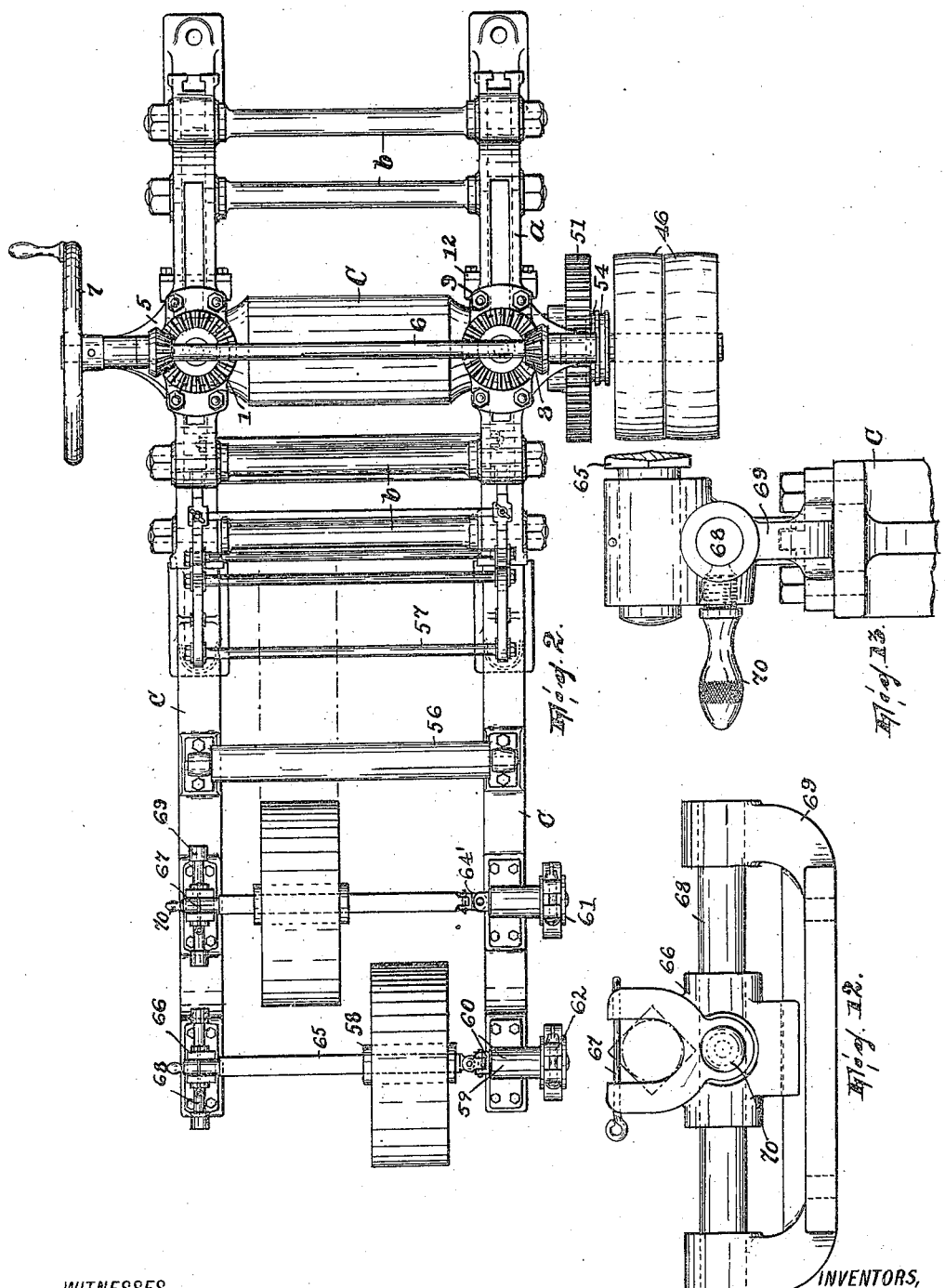

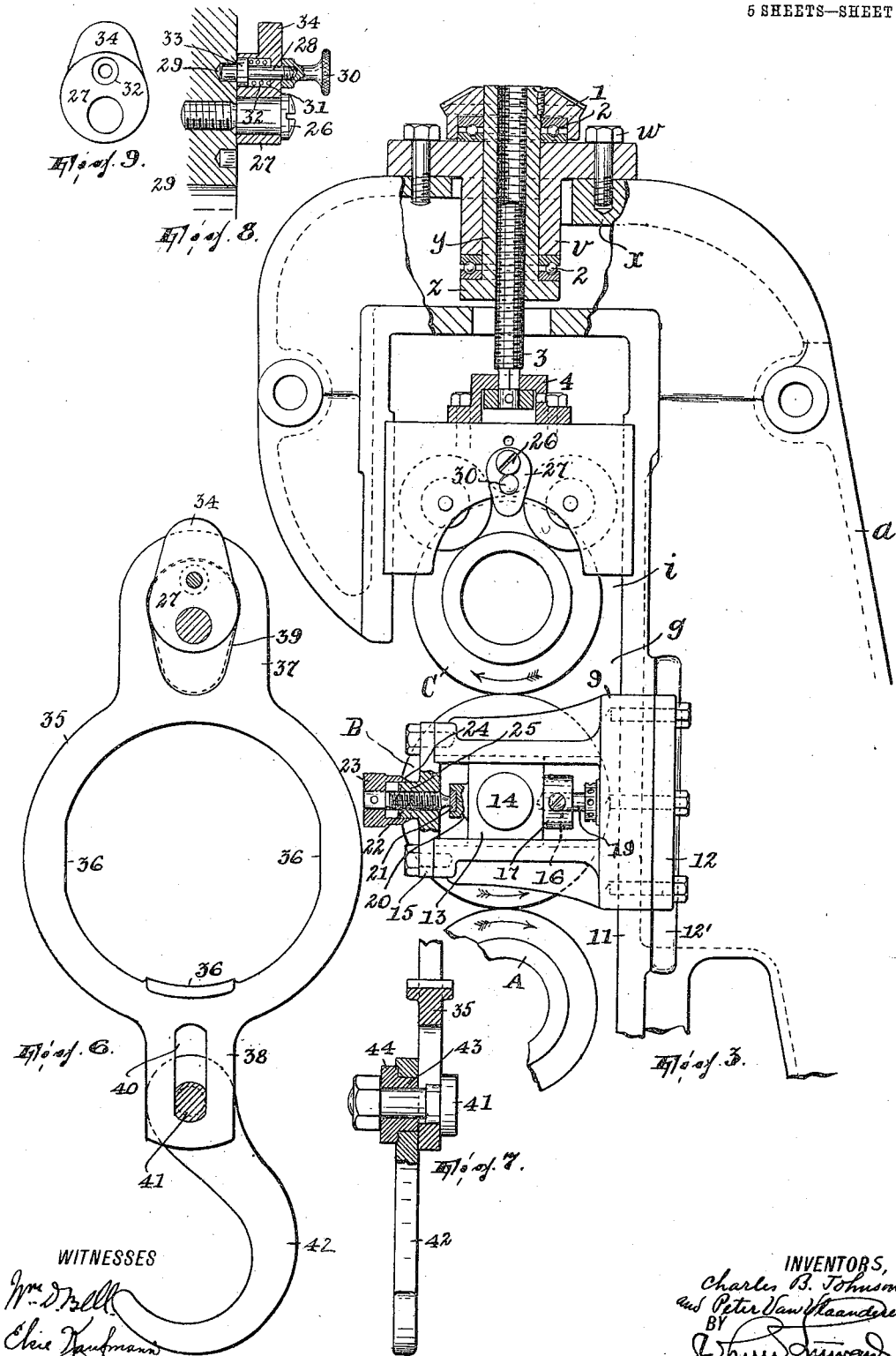

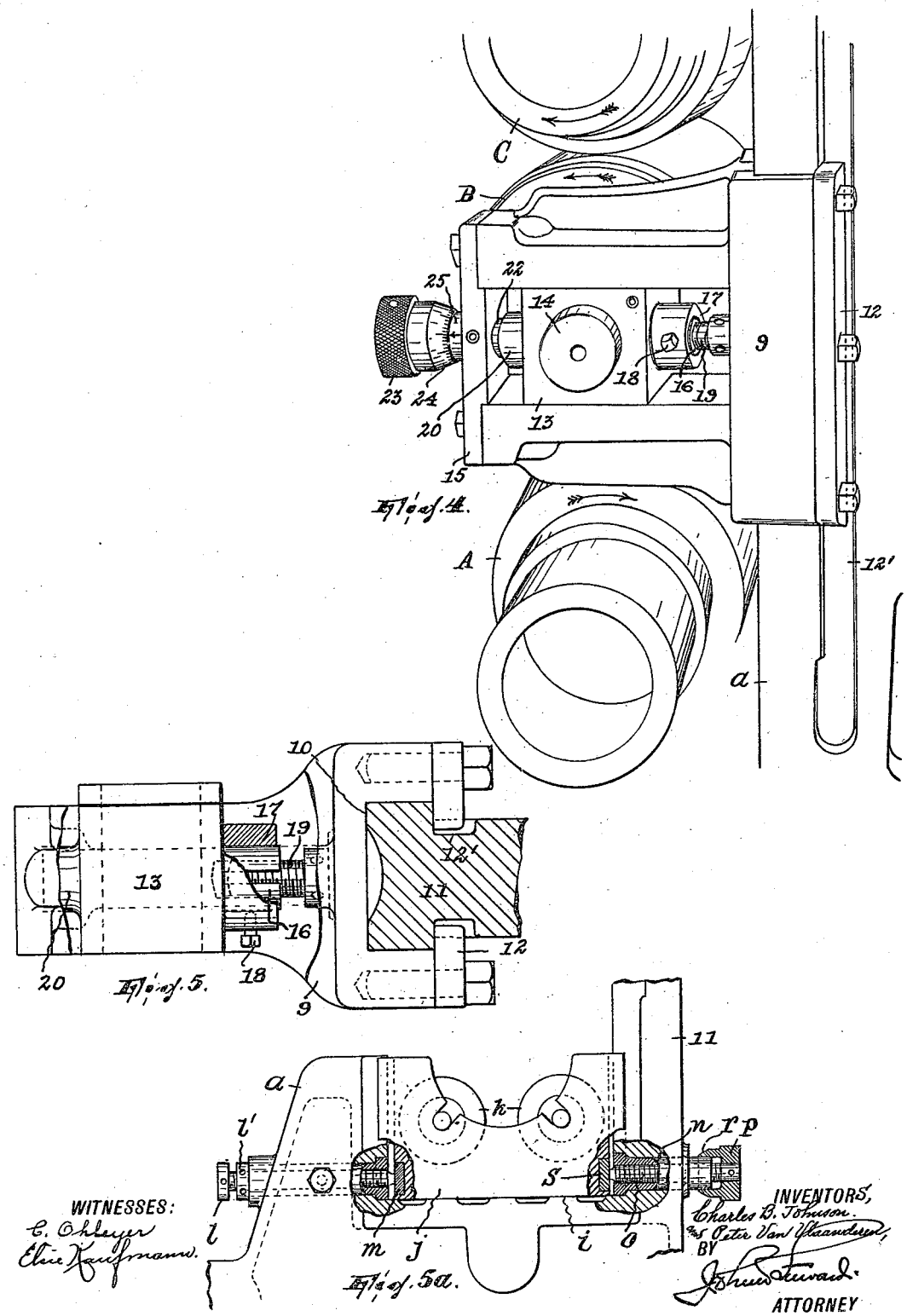

C. B. JOHNSON & P. VAN VLAANDEREN.
MOIRE MACHINE.
APPLICATION FILED JAN. 20, 1910.
961,863.
Patented June 21, 1910.
5 SHEETS—SHEET 5.
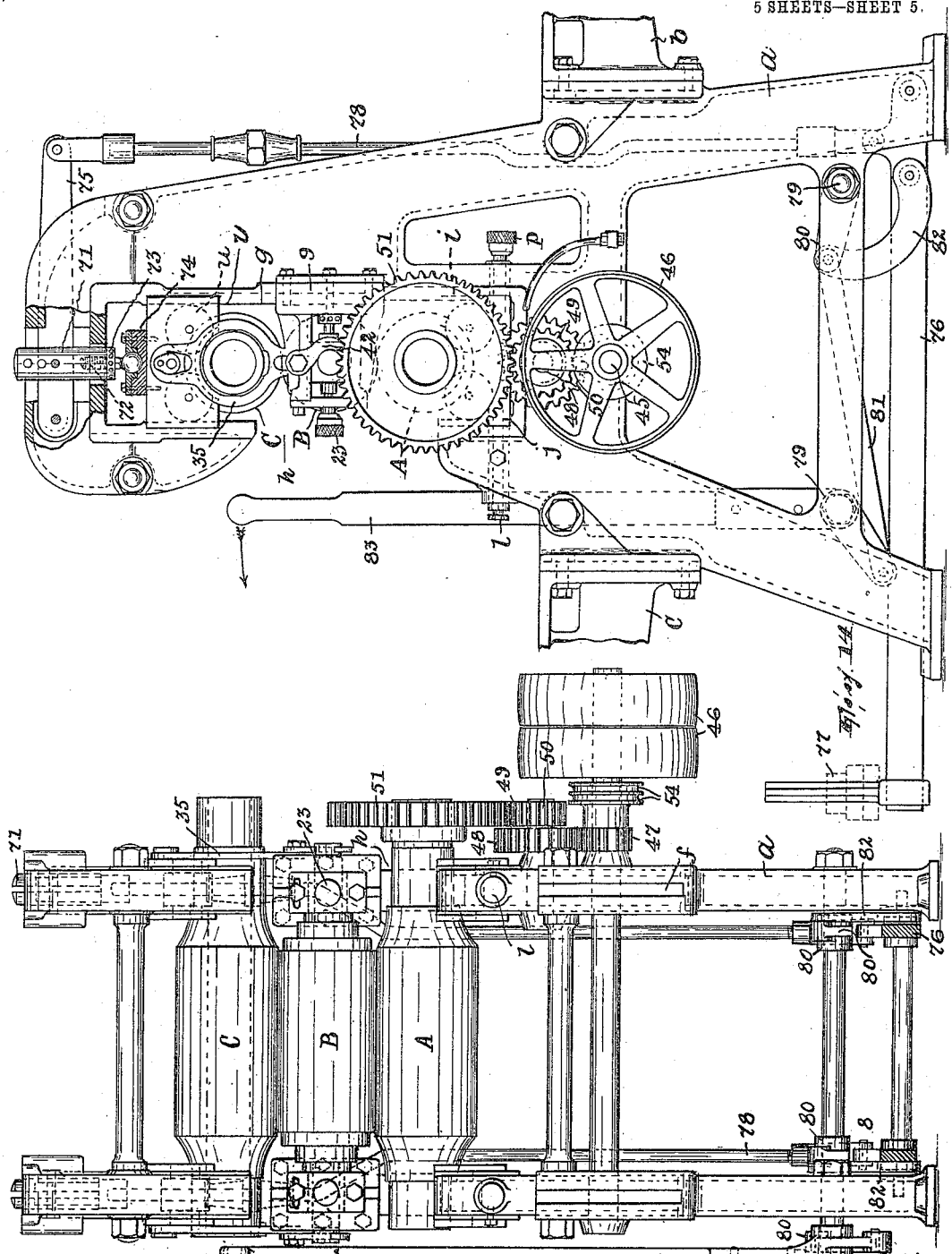

UNITED STATES PATENT OFFICE.

CHARLES B. JOHNSON AND PETER VAN VLAANDEREN, OF PATERSON, NEW JERSEY, ASSIGNORS TO THE JOHNSON VAN VLAANDEREN MACHINE CO., OF PATERSON, NEW JERSEY, A CORPORATION OF NEW JERSEY.

MOIRE-MACHINE.

961,863.      Specification of Letters Patent.      Patented June 21, 1910.

Application filed January 20, 1910. Serial No. 539,067.

*To all whom it may concern:*

Be it known that we, CHARLES B. JOHNSON and PETER VAN VLAANDEREN, citizens of the United States, residing in Paterson, Passaic county, New Jersey, have invented a certain new and useful Improvement in Moire-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to machines for producing moire or watered effects in woven fabrics, and it consists in certain improvements in such machines having for their principal objects, first, to enable the operator quickly and accurately to set the rolls of the machine in proper relation to each other especially when, after one set of rolls has been for a time displaced by another or others, the same is to be reëstablished in the machine; second, to make it possible to unship from and establish the rolls in the machine with facility and quickly and without mutilating or injuring their moire ribs, called "picks". To these ends the rolls are arranged in their bearing members in such manner and are provided with adjusting means of such nature (preferably appropriated to two of the rolls) that, while the necessary movements of the rolls to cause them to bear or press upon each other or to become spaced from each other are provided for, they may be quickly and accurately set so as to register properly with each other and may also, when any one set has been for a time replaced in the machine by another or others, be returned to the machine in their originally adjusted condition without the necessity of repeating the tests which are required to insure their proper registry on the original adjustment thereof; and said bearing members are arranged in open recesses in the frame so formed as to permit the quick and facile removal of the rolls and expose them to the clear view of the operator.

Other objects aimed at and advantages secured in and by the improved machine will appear herein or at once be perceived by those skilled in the art upon a view to the following description when read in connection with the accompanying drawings, in which—

Figure 1 is a side elevation of the machine; Fig. 2 is a plan view, the right-hand end-portion appearing in Fig. 1 being removed; Fig. 3 is a side elevation, partly in section, of the upper part of the machine, the view being on a slightly larger scale than that of Fig. 1; Fig. 4 is a perspective view showing the three rolls and the means for adjusting the middle or impressed roll; Fig. 5 is a plan view, partly in section, of one of the bearing members for the impressed roll, a certain part 15 being removed and said member being partly broken away and partly shown in section; Fig $5^a$ is a fragmentary view showing the bearing means for the lower impression roll; Figs. 6, 7, 8 and 9 are detail views illustrating one of the shackles and the means whereby it is removably supported; Figs. 10 and 11 are horizontal and vertical sectional views of a part of the frame in which one of two brackets $c$ and $d$ is arranged; Figs. 12 and 13 are side and end views, respectively, of the means for adjustably supporting one of the delivery cloth-beams; and, Figs. 14 and 15 are a side and front view, respectively, of a modified form of the machine, Fig. 14 appearing partly in section.

The frame of the machine comprises two side-standards $a$, connected together by tie-rods or braces $b$, and two pairs of brackets $c$ and $d$ projecting the one pair forwardly and the other backwardly from said side-standards; the brackets are bolted to the side-standards and each may have a cross-sectionally T-shaped tongue $e$ engaged with a similarly shaped seat or groove $f$ in the corresponding side-standard so as to afford a more substantial support therefor.

A vertically elongated opening $g$ is formed in each side-standard, the two openings being exactly opposite to each other; the portion of each side-standard forward of its opening and about midway its depth is removed, as at $h$, to produce a passage through which the rolls may with facility be introduced to or removed from the boxes $i$ which are formed by the upper and lower ends of the opening or recess $g$.

In these machines, as is well known, three rolls arranged substantially in alinement with each other are employed, the intermediate roll being formed of paper or some such yielding material in which impressions may be formed by the other two rolls, and the other two rolls being formed of metal, usually steel. Each metal roll is formed with a fluted or ribbed surface, the flutings or ribs (called "picks") extending parallel with the axis of the roll and each, as well as the space between any two ribs, presenting a V-shaped cross-section, and being spaced to conform with the spacings of picks of weft in the cloth. The cloth is introduced between the paper roll and one of the metal or impression rolls and, the three rolls being forced into contact with each other, the cloth is drawn lengthwise and at the same time bellied or otherwise stretched in certain places more than others, with the result that whereas there occurs a general advance of the cloth and rolls in synchrony with each other so far as the greater part of the cloth is concerned, that part of the cloth which is subjected to the stretching slips through or advances faster than the rolls, such part being thus made to show the moire or watered effect. An impressionable material is employed in the "impressed" roll because thus it is found to produce better moire or watered effects than if the same roll were formed of metal or other non-impressionable material. And the third roll (or other metal roll) is employed so that on each revolution of the paper roll its ribs or picks will be by the third roll reproduced in the sharply defined condition which they had prior to the rounding effects imparted to them when acting on the cloth.

Heretofore, the matter of setting the three rolls so that the picks of either metal roll would precisely mesh with the picks in the paper roll produced therein by the other metal roll was very tedious and difficult; as a matter of fact, in machines in which the rolls were interchangeable, it has been practically impossible to secure the nice adjustment necessary, with the consequence that moire or watered effects of inferior appearance were produced. Again, whenever one set of rolls which had been in use were temporarily laid aside while another set or sets of rolls were being used, and the original set was again returned to the machine, there being no record or index to their original adjustment, the tedious operation of readjusting them by reference to repeated tests until it was assured that they properly coöperated with each other had to be pursued. In order to overcome these difficulties, the three rolls in the present instance are supported in the following manner: A is the lower metal or impression roll; B is the intermediate or impressed roll, between which and roll A the cloth extends; and C is the upper metal or impression roll. The roll A is journaled near its ends in blocks $j$ carrying anti-friction rollers $k$ which directly form the bearings for the roll A, the blocks $j$ being fitted to the lower boxes $i$ of the recess $g$ in the side-standards. These blocks are adjustable horizontally, in the direction of the feed of the cloth through the machine, each by means of opposed screws tapped into the vertical walls of the boxes and adapted to engage the front and back faces of the blocks. It being remarked that the adjusting means for the block $j$ which is the farther from the observer in Fig. 1 is identical in character with that the nearer to the observer in Fig. 1, except that the latter is intended to produce a much finer adjustment than the former, further reference to the adjusting means for the block which is the farther from the observer in Fig. 1 is unnecessary. As for the means for adjusting the block which is the nearer to the observer in Fig. 1, $l$ is a set-screw tapped into the nearer side-standard in Fig. 1 and adapted to project through into the box $i$ bearing against the block $j$, a hardened bearing-piece $m$ being set in the block to take the impact of the set-screw; $l'$ is a lock nut for set-screw $l$. Substantially opposite the set-screw $l$ there is fixed in the standard an internally threaded bushing $n$ having a fine thread into which is tapped a screw $o$ having a milled head $p$ whose beveled annular lip $r$ receives the end of the bushing $n$ and may be marked as a gage readable with reference to a point marked on the sleeve. The screw $o$ bears against a hardened bearing-piece $s$ set in the block $j$. The bushing $n$ and screw $o$ form a micrometer adjuster.

In the upper boxes $i$ are guided the vertically sliding blocks $t$, the same receiving anti-friction rollers $u$ forming bearings for the ends of the upper roll C. These blocks are not adjustable horizontally, but by the following mechanism they may be adjusted vertically to exert pressure on the rolls or remove the pressure therefrom: A flanged sleeve $v$ is secured by screws $w$ to the top of each side-standard over its opening $g$, the flange $x$ of the side-standard being provided with an opening to receive the sleeve. This sleeve is penetrated by a vertically elongated nut $y$ which rotates freely therein, having a head $z$ at its lower end and a bevel-pinion 1 fixed to its upper end, anti-friction bearings 2 being interposed between the sleeve $v$ and the head $z$ and bevel-pinion 1 to assume the thrust of the nut $y$, which rotates in the sleeve. This nut receives a threaded stem 3 whose lower end is swiveled in a bearing-piece 4 secured to the top of the block $t$. In brackets 5 surmounting the side-standards is journaled a horizontal shaft 6 carrying a hand-wheel 7 and also having fixed thereon bevel-pinions 8 meshing with the bevel pinion 2. On turning shaft 6 the blocks $t$ will be raised or lowered.

It will be observed that, while the passages $h$ are provided in the side-standards, they are so disposed with reference to the openings that the blocks $t$ find a substantial and rigid support against movement in any direction except vertically.

In the openings $g$ between the blocks $j$ and $t$ are arranged the vertically sliding brackets 9, the same being vertically grooved at the back, as at 10, each to receive the vertical guide-way 11 formed on the corresponding side-standard as the back vertical wall of said opening $g$. Plates 12 are bolted to the back of each bracket 9 one on each side of the corresponding side standard, projecting into vertical grooves 12′ in the side-standard, the same acting to retain the brackets on the guideways. The two brackets 9 are bifurcated horizontally (being open at the front) and each serves as a guide-way for a block 13 forming the bearing for the corresponding trunnion 14 of the paper roll. Each bracket 9 comprises a plate 15 which is bolted thereto, closing at the front the opening forming the guide-way therein for the block 13. The block 13 is adjustable in the brackets 9 in the direction of the length of feed of the cloth through the machine, and referring first to the means for adjusting the block 13 which is the nearer to the observer in Fig. 1: The block 13 is formed with a rearwardly projecting internally threaded split hub or nut 16 surrounded by a collar 17 having a set-screw 18 tapped into the same; the nut receives a screw 19 whose head bears against the front face of the brackets 9. When the screw 18 is made to release the nut, the expansion of the latter allows the screw to turn freely therein; when the block has been finally adjusted, the screw 18 may be turned to bind the screw 19 against turning in the nut. At the front of the block 13 and opposite its hub 16 is formed a projection 20 in which is seated a hardened bearing-piece 21 adapted to assume the thrust of a fine-threaded screw 22 having a milled head 23 formed with an annular beveled lip 24 receiving a boss 25 projecting from the plate 15, said lip being provided with suitable markings readable with reference to a point marked on the boss 25. The adjusting means operating against the front of the block 13, and just described, constitutes a micrometer adjuster. The corresponding bracket 9 at the end the farther from the observer in Fig. 1 may be provided with threaded adjusting devices in the nature of set-screws or the like which, being substantially like that just described (except that the micrometer adjuster is not employed), need no specific description.

It will be observed that the micrometer adjuster for one of the rolls A, B is disposed at the front thereof and for the other at the back thereof, the reason for which will hereinafter appear.

In order to unship the rolls, the rolls B and C are raised sufficiently to allow the roll A to be removed; then the rolls B and C are lowered until the brackets 9 rest upon the blocks $j$, whereupon the roll C is removed; finally the roll B is removed. In reestablishing the rolls in the machine, the roll B is first introduced, then the roll C and finally the roll A, rolls B and C being raised to allow the introduction of roll A. The raising of rolls B and C to allow roll A to be removed and the lowering thereof after roll A has been taken out in the unshipping operation, and the raising of rolls B and C to allow roll A to be introduced and the lowering thereof to their working relation to roll A in the reestablishing operation, are effected by turning the hand-wheel 7, the following mechanism being employed to couple rolls B and C and their supporting means together at these times.

A headed stud 26 is screwed into each block $t$ in the vertical plane of the axes of the three rolls in their working positions and on this is journaled eccentrically a button 27 which may be held with its eccentric portion up or down by a pin 28 adapted to enter either of two holes 29 in the block; said pin, which has a suitable head 30, slides in the button parallel with the axis of the latter, and it penetrates a socket 31 formed in the back of the button to receive a spiral spring 32 coiled about the pin between a shoulder 33 thereon and the bottom of the socket. From the eccentric portion of said button projects a lip 34, leaving some clearance between itself and the face of the block. A shackle for suporting the rolls A and B at the times above referred to is suspended from each of the buttons 27, being constructed as follows: 35 is a loop formed with three interior elevations 36 to take the contact of the corresponding trunnion of the roll C (one of said elevations being arranged at the bottom and the others at the sides of the loop) and having an upwardly projecting ear 37 and a downwardly projecting ear 38, the former having a slot 39 whereby it may be passed over the enlarged extremity of the button 27 and the latter a vertical slot 40. By means of a bolt and nut 41, a hook 42 is suspended from the ear 38 of the loop, a bushing 43 being preferably arranged on the bolt and affording the bearing for the hook; the bolt and nut clamp the bushing to the ear 38, the bushing having a flange 44 between which and the ear the hook is held against endwise movement. The bolt and the parts carried thereby may be adjusted in slot 40 for a purpose to be indicated.

In establishing the rolls in the machine, plates 15 being removed from blocks 9, bearing blocks 13 are placed on the trunnions of roll B and then fitted to the blocks 9; the plates are now replaced and the means for adjusting blocks 13 roughly set. At this time, blocks 9 are resting on blocks $j$ and the upper blocks $t$ are suspended by their raising and lowering means high enough above blocks 9 to allow the roll C to be introduced. The shackles having been now suspended from the buttons 27 and the upper roll C supported thereby, the buttons are turned from the position in Fig. 3 to that in Fig. 1, so that roll C is raised slightly into at least approximate contact with the rollers $u$. The upper roll is now lowered, by turning hand-wheel 7, until it rests upon roll B, whereupon the hooks of the shackles are engaged with the trunnions of roll B, being adjusted in the shackles so that when rolls C and B are elevated, the hooks maintain said rolls almost (but not quite) in contact with each other. The hand-wheel 7 is now turned in the reverse direction so as to raise the blocks $t$, which latter, by means of the shackles will carry rolls C and B, as well as the blocks 9, up with it. Roll A is now introduced into its bearings, whereupon hand-wheel 7 is again rotated to depress rolls B and C and until roll B approximately (though not quite) contacts with roll A, contact between the rolls never being of course allowed (since rolls A and C are heated and would damage roll B) except when they are rotating. The machine is now ready for adjusting.

In unshipping the rolls, the hand-wheel 7 is manipulated to raise blocks $t$ and, through the shackles, rolls B and C and blocks 9, so as to permit roll A to be removed. Upon turning the hand-wheel 7 in the reverse direction, the parts $t$, C, B and 9 are lowered until the blocks 9 rest on the blocks $j$. The hooks are now disengaged from the trunnions of roll B and the hand-wheel turned again, this time to elevate the blocks $t$ which, by means of the shackles, raise roll C with them. The buttons are now turned down, the shackles and roll C thereby falling a little, whereupon the shackles are removed and roll C withdrawn. Roll B is now removed, having first removed the plates 15. It will be observed that the eccentric mounting of the buttons has for its purpose to allow some lost motion between roll C and the rollers $u$ in order to allow the shackles to be slipped over and removed from the trunnions of the roll with freedom. The purpose of the slots 40 in the shackles is to allow adjustment for different sized rolls.

As has been already stated the upper roll is not adjustable horizontally, any adjustment necessary being made to affect the rolls A and B; roll C is simply so disposed when working that its axis is as near as possible perpendicular to the line of feed through the machine. At the time of introducing the rolls, the blocks 13 for roll B and the blocks $j$ for roll A are roughly adjusted so as to bring the axes of the three rolls as near as possible in the same plane, for which purpose a visual inspection of the rolls is readily had owing to the clearance formed by the passages $h$ in the side standards. Coming, now, to the final adjustment of the machine, if the near end of roll B in Fig. 1 is not already a little too far to the left, the operator manipulates the right-hand adjusting means thereon to arrange it so, then turns screw 19 to allow clearance between its head and the back of bracket 9, and finally manipulates the micrometer adjuster so as to shift the end of the roll to the right as far as it should go to produce exact parallelism between the picks of rolls B and C. The screw 19 is now turned out until its head abuts against the back of bracket 9 and block 13 is held secured between the micrometer adjuster and screw 19, the locking means for screw 19 being meanwhile made to secure said screw. Substantially the same operations are then carried out with respect to the adjusting means for roll A, so that the picks thereof come into exact parallelism with the picks of roll B. The accuracy of the adjustment may now be tested by passing a piece of the goods between the rolls. In view of the fact that the adjustment of the rolls is effected principally from only one side of the machine and that the micrometer adjusters for the rolls A and B operate from relatively opposite sides of the trunnions of these rolls, the adjusting operations may be performed more accurately as well as more quickly and with greater convenience. Moreover, (the direction of rotation of the rolls being as indicated in Fig. 3), since the tendency toward displacement is for the lower roll (A) forward and for the middle roll (B) backward, the thrust of the block $j$ under this influence is taken up by screw $l$ and that of block 13 by screw 19, and not by the more delicate micrometer adjusters.

When one set of rolls has once been adjusted, the relative positions thereof are made a matter of record by reference to the marking on the micrometer adjusters. If, therefore, such set of rolls has to be removed, when it is returned to the machine, all it is necessary to do is to set the micrometer adjusters in their original positions and adjust all the other parts with reference to them.

The power is taken into the machine through a shaft 45 carrying the fast and loose pulleys 46 and also carrying a pinion 47 which meshes with a gear 48 rotating with a pinion 49 on a stub-shaft 50, the pinion 49 meshing with a gear 51 on the trunnion of roll A which is the nearer to the observer in Fig. 1. The roll A being driven, the other two rolls will rotate when the three rolls are under pressure.

On the bracket $d$ are journaled suitable take-up or receiving beams 52, the mechanism of which it is unnecessary to describe further than to say that each has a pulley 53 around which and corresponding pulleys 54 on shaft 45 endless belts 55 extend, so that the beams are rotated from the shaft 45.

On the brackets $c$ are arranged any well-known means 56 and 57 for guiding and forming a bulge in the cloth, as also the means for supporting the beams 58 from which the cloth to be treated is unwound. In brackets 59 bolted to one of the brackets $c$ are journaled rotary spindles 60 having their inner ends forked and each having a peripherally grooved head 61 at its outer end. Each head 61 is received between two clips 62 connected at their ends by thumb screws forming a clamp whose frictional resistance on the head 61 may be varied by adjusting the thumb-screws 63. Each clamp is normally held against rotation by a stud 64 projecting from the bracket $c$. A universal joint 64' serves to connect to each spindle a squared shaft 65 (the bore of each beam 58 being likewise square so as to fit the shaft and turn therewith). The free end of each shaft is round in cross-section and is journaled in a forked bearing 66, being held therein by a pin 67. Said bearing slides on a shaft 68 arranged longitudinally of the machine in a bracket 69, and it carries a screw 70 which may be made to bind against the shaft 68 so as to secure the bearing at different points on the shaft.

The machine shown in Figs. 14 and 15 is substantially like that already described except with respect to the means for imposing pressure upon the block $t$, and hence upon the rolls B and C and brackets 9. A post 71 is guided vertically in each side standard $a$, the said post having a screw 72 formed with a ball head and adapted to be secured where adjusted in the post by a lock-nut 73. The ball-head of the screw is received by a bearing 74 on the corresponding block $t$. In each side standard is fulcrumed a lever 75 which is pivoted in the post, the post being split to receive the same. (Fig. 15.) Two levers 76 are fulcrumed in the side standards and are constructed to carry weights 77 at their free ends, said levers being connected with the levers 75 by the adjustable pitmen 78. A rock shaft 79 is journaled parallel with the fulcra of the levers 75 and 76 and it carries three cranks 80; one of these cranks is connected with the operating lever 83 by a pitman 81, while the other two are connected with the levers 76 by the curved links 82. While the machine is operating, the parts 75, 76, 77 and 78 act to maintain pressure on the rolls. For removing the pressure and for elevating the rolls B and C, the weights 77 being removed, lever 83 is pulled forward, raising parts 76, 78, 75, 71 and 72, and consequently the blocks $t$ and rolls B and C, together with brackets 9.

Having thus fully described our invention, what we claim as new and desire to secure by Letters Patent is:—

1. In a moire machine, the combination of a suitable supporting structure, a plurality of superposed rolls, a bearing means for the upper roll, another bearing means for the lower roll, one of said bearing means being movable toward and from the other, and means, comprising a micrometer adjuster, for adjusting one of said bearing means in the direction of the feed between the rolls, substantially as described.

2. In a moire machine, the combination of a suitable supporting structure, three superposed rolls, separate bearing means for the three rolls, and means, comprising a micrometer adjuster for each of two of the bearing means, for independently adjusting the latter two bearing means in the direction of the feed between the rolls, substantially as described.

3. In a moire machine, the combination of a suitable supporting structure, three superposed rolls, separate bearing means for the three rolls, and means, comprising micrometer adjusters active against relatively opposite points of two of the bearing means, for independently adjusting said two bearing means in the direction of the feed between the rolls, substantially as described.

4. In a moire machine, the combination of a suitable support, three superposed rolls, separate bearing means for the three rolls, the middle and lower bearing means being adjustable in the direction of the feed through the machine and the upper bearing means being confined against movement in said direction, and means, comprising micrometer adjusters active against substantially opposite points of each of the middle and lower bearing means, for independently adjusting the latter two bearing means in said direction, substantially as described.

5. In a moire machine, the combination of a suitable support, three superposed rolls, separate bearing means for the three rolls, the upper bearing means being movable vertically and confined against horizontal movement, vertically movable brackets carrying the intermediate bearing means, the lower bearing means occupying a relatively constant elevation in said support, means for raising and lowering the upper bearing means, and means, comprising micrometer adjusters active against relatively opposite points of each of the middle and lower bearing means, for independently adjusting the latter two bearing means in said direction, substantially as described.

6. In a moire machine, the combination of a suitable supporting structure, three superposed mechanisms arranged in said structure and comprising three superposed and coactive rolls respectively contained in said mechanisms, the middle and upper mechanisms being movable toward and from the lower mechanism and toward and from each other, adjustable means for coupling the middle and upper mechanisms together, and means for effecting the movements of said upper mechanism, substantially as described.

7. In a moire machine, the combination of a suitable support, three superposed mechanisms arranged in said support and comprising three superposed and coactive rolls respectively included in said mechanisms, the middle and upper mechanisms being movable toward and from the lower mechanism and toward and from each other, means, connected with the upper mechanism, for effecting such movements, loops suspended in the upper mechanism and receiving the roll thereof, and hooks depending from said loops and engaging the roll of the middle mechanism, substantially as described.

8. In a moire machine, the combination of a suitable support, three superposed mechanisms arranged in said support and comprising three superposed and coactive rolls respectively included in said mechanisms, the middle and upper mechanism being movable toward and from the lower mechanism and toward and from each other, means, connected with the upper mechanism, for effecting such movements, loops receiving the upper roll, means, operative to effect vertical movement of said loops, for sustaining them in the upper mechanism, and hooks depending from said loops and engaging the roll of the middle mechanism, substantially as described.

9. In a moire machine, the combination of a suitable support, three superposed mechanisms arranged in said support and comprising three superposed and coactive rolls respectively included in said mechanisms, the middle and upper mechanisms being movable toward and from the lower mechanism and toward and from each other, means, connected with the upper mechanism, for effecting such movements, loops suspended in the upper mechanism and receiving the rolls thereof, and hooks adjustably suspended from said loops and engaging the roll of the middle mechanism, substantially as described.

10. The combination, in a moire machine, of a supporting structure having opposed, substantially coinciding vertically elongated openings therein and passages opposed to and coinciding with each other and entering said opening at the corresponding long sides and between the ends thereof, and superposed mechanisms fitted in said openings and comprising coactive rolls having their adjacent portions normally opposite said passages, substantially as described.

11. The combination, in a moire machine, of a supporting structure having opposed, substantially coinciding vertically elongated openings therein and passages opposed to and coinciding with each other and entering said openings at the corresponding long sides and between the ends thereof, and superposed mechanisms fitted in said openings and comprising coactive rolls having their adjacent portions normally opposite said passages, one of said mechanisms being guided in corresponding end-portions of said openings for movement vertically, substantially as described.

12. The combination, in a moire machine, of a supporting structure having opposed, substantially coinciding openings therein and passages opposed to and coinciding with each other and entering said openings substantially horizontally and between the upper and lower ends thereof, bearing means arranged in the lower ends of the openings, a roll journaled in said bearing means, bearing means guided for movement vertically in the upper ends of the openings, a roll journaled in the last-named bearing means, another roll journaled between the first two rolls, bearing blocks affording journals for the last-named roll, and brackets arranged in said openings and movable toward and from each bearing means and removably receiving the bearing blocks, each roll being of less diameter than the width of said passages, substantially as described.

13. In a moire machine, the combination of a suitable support, superposed rolls, separate bearing means for the upper rolls, bearing means for the lower rolls, parallel threaded stems attached to the first bearing means, nuts revoluble in said support and receiving said stems, separate anti-friction bearings assuming the thrust of each nut in both directions axially thereof, and means for effecting synchronous rotation of said nuts, substantially as described.

14. The combination, in a moire machine, of a supporting structure, coactive rolls and bearing means therefor, and a let-off mechanism comprising a rotary-beam carrying member, another rotary member journaled in the frame, a universal joint connection between one end of the beam-carrying member and the other member, and means for supporting the other end of the beam-carrying member, said means being adjustable toward and from the rolls, substantially as described.

15. The combination, in a moire machine, of a supporting structure, coactive rolls and bearing means therefor, and a let-off mechanism comprising a rotary-beam carrying member, another rotary member journaled in the frame, a universal joint connection between one end of the beam-carrying member and the other member, a shaft extending parallel with the direction of feed between the rolls, a bearing slidable on said shaft and supporting the other end of said beam-carrying member and means for securing said bearing means in fixed relation to the shaft, substantially as described.

In testimony, that we claim the foregoing we have hereunto set our hands this 17th day of January, 1910.

CHARLES B. JOHNSON.
PETER VAN VLAANDEREN.

Witnesses:
JOHN W. STEWARD,
WM. D. BELL.